United States Patent
Brown (10) Patent No.: US 12,482,026 B1
(45) Date of Patent: *Nov. 25, 2025

(54) SYSTEM AND METHOD FOR SELLING CUSTOMER-SPECIFIC DATA SUBSETS ON A THIRD-PARTY WEBSITE USING A WEB WIDGET

(71) Applicant: Joel Brown, Sydney (AU)

(72) Inventor: Joel Brown, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/140,703

(22) Filed: Jan. 4, 2021

Related U.S. Application Data (63) Continuation of application No. 16/158,743, filed on Oct. 12, 2018, now Pat. No. 10,885,563, which is a continuation of application No. 12/949,517, filed on Nov. 18, 2010, now Pat. No. 10,102,557.

(60) Provisional application No. 61/263,001, filed on Nov. 20, 2009.

(51) Int. Cl.
  *G06Q 30/06* (2023.01)
  *G06Q 30/0601* (2023.01)

(52) U.S. Cl.
  CPC ..... *G06Q 30/0619* (2013.01); *G06Q 30/0635* (2013.01)

(58) Field of Classification Search
  CPC ...... G06Q 30/02–0205; G06Q 30/0241–0277; G06Q 30/0601–0643; H04L 67/00; H04L 67/30; H04L 67/306; G06F 21/60; G06F 21/6245; G06F 21/6254; G06F 21/6263; G06F 21/6272
  See application file for complete search history.

(56) References Cited

U.S. PATENT DOCUMENTS

| | | | |
|---|---|---|---|
| 7,702,754 B2 | 4/2010 | Dreiling | |
| 2009/0070201 A1* | 3/2009 | Hodges | G06Q 10/04 705/26.1 |
| 2009/0182615 A1 | 7/2009 | Pai | |

(Continued)

OTHER PUBLICATIONS

Larry Clarkin and Josh Holmes, Enterprise Mashups, The Architecture Journal, Journal 24, believed to have been published in Oct. 2007, but cannot confirm whether the submitted herewith, which is dated Aug. 19, 2010, is the same as originally printed.

(Continued)

*Primary Examiner* — William J Allen
(74) *Attorney, Agent, or Firm* — Venjuris, P.C.

(57) ABSTRACT

The invention is incorporated into an interactive web data seller widget that enables any ecommerce site to provide access to and from large, remotely stored databases to its web visitors and for those visitors to prospect/filter within the databases, for example both via geographic and demographic criteria. Users can find, for example, appropriate geographic and demographic matches to any applicable search criteria. Additionally the invention enables the web visitor to order as a deliverable subset of the remotely stored database a detailed list of the required database subset and for the ecommerce site to sell that data subset to the visitor via a web shopping cart and checkout process. And the invention enables the web visitor to preview the selected subset of data from any database prior to placing an order for the same.

10 Claims, 5 Drawing Sheets

(56) References Cited

U.S. PATENT DOCUMENTS

2010/0042500 A1  2/2010  Pritchard et al.
2010/0104101 A1  4/2010  Dickenson et al.

OTHER PUBLICATIONS

Sunilkumar Peenikal, Mashups and the Enterprise, Mphasis, White Paper, bearing the date of Sep. 2009, original publication date unknown, the submitted herewith was only located in Aug. 2010.
James Niccolai, So What is an Enterprise Mashup Anyway?, PCWorld, believed to have been published on Apr. 23, 2008, but cannot confirm whether the submitted herewith, which is dated Aug. 30, 2010, is the same as originally printed.

\* cited by examiner

SYSTEM AND METHOD FOR SELLING CUSTOMER-SPECIFIC DATA SUBSETS ON A THIRD-PARTY WEBSITE USING A WEB WIDGET

CROSS-REFERENCE TO RELATED APPLICATIONS

The present application claims priority to United States non-provisional patent application entitled "System and Method for Selling Customer-Specific Data Subsets on a Third-Party Website using a Web Widget," having Ser. No. 16/158,743, filed on Oct. 12, 2018, which in turn claims priority to United States patent entitled "System and Method for Selling Customer-Specific Data Subsets on a Third-Party Website using a Web Widget," reg. no. 1010255, application Ser. No. 12/949,517, filed on Nov. 18, 2010, which in turn claims priority to United States provisional patent application entitled "System and method for a web data-widget providing data mining and data acquisition from large remotely located databases," having Ser. No. 61/263,001, filed on Nov. 20, 2009, all of which are entirely incorporated herein by reference.

BACKGROUND OF THE INVENTION

Field of the Invention

The present invention relates to selling individually-tailored customer-specific data subsets on a third-party website using a data seller widget. The third-party website may be integrated into any application which may be installed on a user's computer or provided by Software As A Service (SAAS).

SUMMARY OF THE INVENTION

The invention is summarized below only for purposes of introducing embodiments of the invention. The ultimate scope of the invention is to be limited only to the claims that follow the specification.

Generally, the present invention is incorporated into a system for selling individually-tailored customer-specific data subsets on a third-party website using a data seller widget. The system comprises a data seller widget placed within a third-party website that enables two-way exchange of information between (1) the data seller widget, (2) a customer's browser, (3) a data seller server [incorporating the database server], and (4) the host server for the third-party website. It is preferred that the data seller widget include an interactive GUI when viewed by a web browser.

Preferably, the two-way exchange of information is accomplished by a plurality of APIs and would exchange information between (1) the data seller widget and a host server for the third-party website, (2) the data seller widget and a host webpage; (3) the data seller widget and at least one remote data seller web server, (4) the data seller widget and at least one remote data seller database server, and (5) the data seller web server and the host server for the third-party website for the purpose of completing a sale of data to a customer of the third-party website. While the above is preferred, a single API or any alternative communication method could be used to exchange information between (1) data seller widget server [incorporating the database server] (2) host server for the third-party website (3) customer browser and (4) data seller widget.

One object of this invention is to provide customers of an ecommerce site the ability to create and purchase subsets of data from a plurality of remote databases as well as use those data subsets within the ecommerce website.

Another object of this invention is to enable customers of an ecommerce site to find matches within a database for example to select geographic and or demographically selectable subsets of large databases.

Another object of this invention is to enable customers of an ecommerce site to search for subsets of large remote databases by applying a combination of geographic and demographic criteria to create the said subsets of data.

Another object of this invention is to enable customers of an ecommerce site to purchase their desired subset of data once those have been identified.

Another object of this invention is to offer customers of an ecommerce site access to remote large databases for its visitors without having the requirement to install those databases locally on its own servers.

Another object of this invention is to present the customers of an ecommerce site with an easy-to-use web interface which enables filtering of subsets of data for example geographic and demographic filtering of large databases with real-time counts.

Another object of this invention is to integrate multiple remote databases of information as a pre-requisite to the proper function of the web-widget. An example of these is the US Postal Services (USPS) databases of place names and Zip Codes which may be updated frequently. Another example is a place name latitude and longitude lookup which returns a specific latitude and longitude for any street address.

Another object of this invention is to enable customers of an ecommerce site to preview a customer-selected subset of data in real-time prior to purchasing the subset of data.

Since data sets often fluctuate regularly, an ecommerce site cannot reasonably rely on the currency of the data and services provided. One object of this invention is to keep one set of data updated remotely and then provide that updated data via a single data-web-widget. In this way, the data currency can be distributed to a large number of ecommerce sites simultaneous with each central update.

Another object of this invention is to provide this data-widget as a Software As A Service (SAAS) model with the data-widget code on a remote server not controlled by the ecommerce application but provided as a SAAS.

Another object of this invention is a plug-and-play web data-widget for use within an existing ecommerce web site to provide the functionality above.

Another object of this invention is to communicate in multiple directions between the data seller widget, the computer controlling the third-party web site, and the computer controlling the data seller database.

DESCRIPTION OF THE DRAWINGS OF PREFERRED EMBODIMENT

SUMMARY OF A BASIC EMBODIMENT

Figure 1:
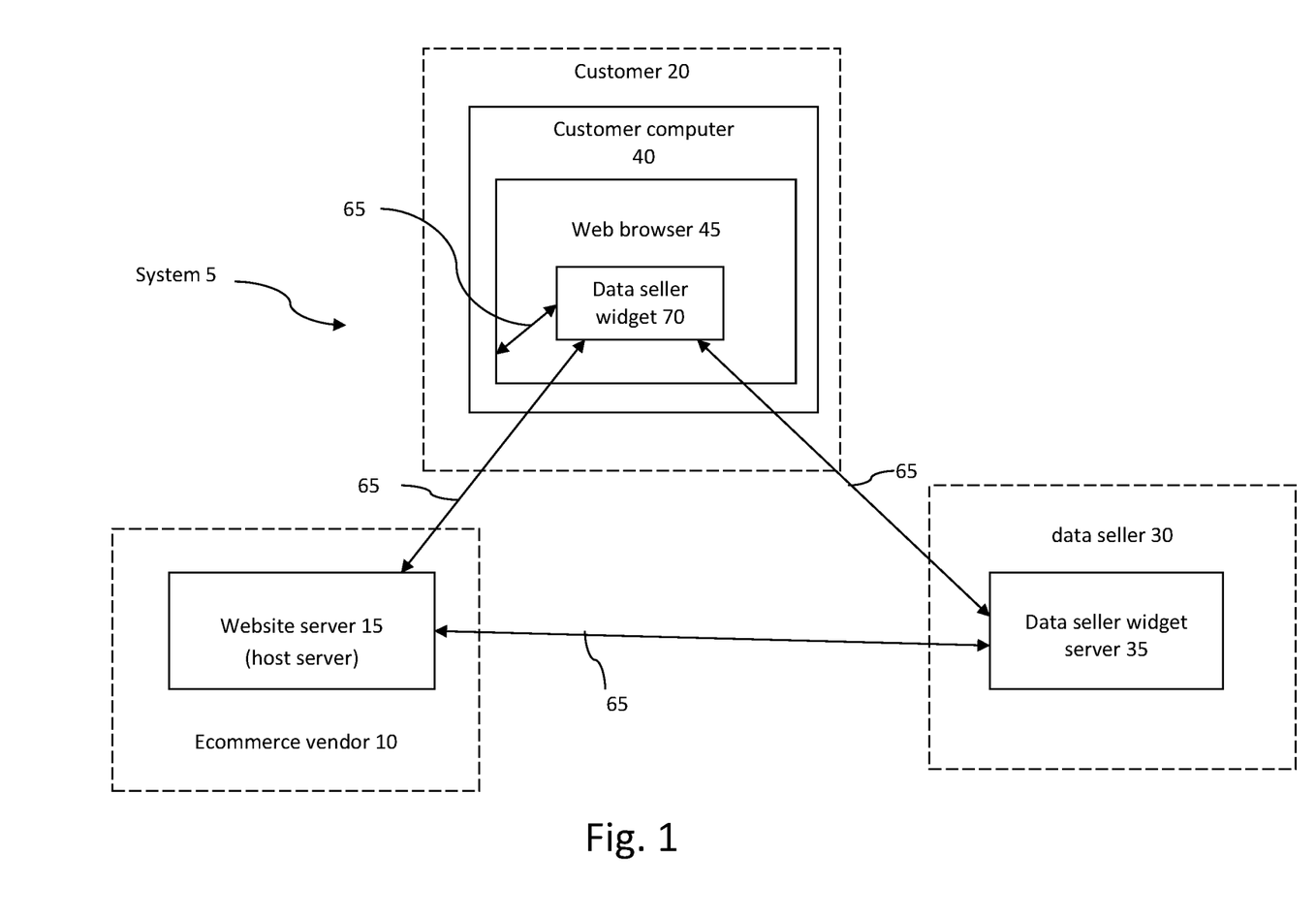
FIG. 1 illustrates a basic embodiment of the system 5 and the various relationships between the three parties: the ecommerce vendor 10, the customer 20, and the data seller 30.

FIG. 1 illustrates a basic embodiment of the system for selling individually-tailored customer-specific data subsets on a third-party website using a data seller widget 70. As shown, the system comprises at least three parties: an ecommerce vendor 10, a customer 20, and a data seller 30. Broadly, the linchpin of the system is the data seller widget 70. The data seller widget 70 is located within at least one web page of the ecommerce vendor's 10 website. The data seller widget 70 enables two-way exchanges of information 65 as shown. With the data seller widget server 35 having access to a database of relevant information, a customer 20, using a computer 40 can search, select, pay and use a subset of that data within the ecommerce vendor's 10. At a minimum, a single API or suitable alternative communication method would exchange information between (1) data seller widget server 35 [having access to the database server], (2) the website server 15 (or host server), (3) browser 45 and (4) data seller widget 70.

As described in more detail below, the system creates synergies for all three parties involved. First, the system helps the ecommerce site increase the scope of its business because it can offer its customers the ability to prospect/filter remote databases to create custom-tailored subsets of useful information for use within its own ecommerce site. Second, the system enables a customer 20 to obtain greater efficiencies by being able to create and use data subsets that the customer 20 would otherwise have to obtain and upload outside the confines of the ecommerce site 10. Third, the system enables the data seller 30 to reach a wider range of customers without requiring direct contact with the customer 20. Fourth, the system enables an ecommerce site to embed the widget 70 quickly and with little effort because it is a relatively small chunk of code. Fifth, the system enables an ecommerce site to act as a reseller-selling subsets of data and making a profit margin. Sixth, the system allows private data to be piped into the seller's database servers and made available to specific widgets 70—providing real-time subsets of data from historic sales data.

For example, a customer 20 may want to use a certain subset of geographic and demographic information for a specific purpose on an ecommerce site. The problem is that the ecommerce site is not in the business of providing that subset of information. The system disclosed herein enables the ecommerce customer 20 to purchase a deliverable subset of the remotely stored database in the form of a customized list from the ecommerce site via a web shopping cart and checkout process in a manner that can be made transparent to the ecommerce customer 20.

Example: Sandwich Shop/Web-to-Print

A specific example may help to understand how the system operates. In this example, the customer 20 is a sandwich shop. The customer is looking to market his sandwiches by designing and sending postcards to all of the residents within five miles of the customer's shop. The customer navigates to a "web-to-print" website controlled by the ecommerce vendor 10. The web-to-print website allows the customer 20 to design and send custom postcards. The web-to-print site even allows the customer to upload a mailing list. The web to print site does not, however, have its own database that can identify residents within five miles of the customer's shop.

A third-party data seller 30 does have a database that can be searched to obtain the specific data subset that the customer wants. Using the data seller widget 70, the customer 20 accesses the data seller's database via server 35, obtains a list of residents within a five mile radius of the customer's shop and then uses that mailing list to send out custom postcards though the web-to-print site. Preferably, the customer 20 pays for the data subset (in this case the names and addresses) during check-out at the web-to-print site and the data seller and web-to-print vendor can settle their accounts at the same or subsequent time. Throughout the process, the customer 20 need not know that a third-party data seller 30 is involved.

DESCRIPTION OF PREFERRED EMBODIMENT

In this specification, the term data seller 30 means any entity that owns or controls a collection of data. The data seller stores its data in electronic format and typically accesses the data via a database server 80. The data seller also typically operates a web server 90. Both the database server and the web server, as well-known in the art, each respectively employ a processor and memory for accessing the electronic data and serving web pages. The data seller database server 80 and data seller web-server 90 can be separate servers or the same server depending on the circumstances. In general, the data seller web server 90 will host the script for data seller widget 70 and access the data seller database server 80 as needed.

In this specification, a third-party website means a website that is not owned or controlled by the data seller 30. Typically, the third-party website is an ecommerce site operated by an ecommerce vendor 10. In this specification, an ecommerce vendor 10 is any vendor that offers goods or services using the internet. Typically, an ecommerce vendor 10 will employ a host server 50 to serve its web pages to its users and customers. At least one of the web pages will include the data seller widget 70. The host server, as well-known in the art, uses a processor and memory to serve its web pages. Alternatively, the third-party website may be integrated into any application which may be installed on a user's computer or provided by Software As A Service (SAAS).

In this specification, the term "web widget" means a stand-alone application that can be embedded into a web page. Typically a web widget is a portable chunk of code that can be installed and executed within any separate HTML-based web page without requiring additional compilation. Other terms used to describe web widgets include gadget, plugin, badge, module, webjit, capsule, snippet, mini and flake. A web widget can be written in any computer readable language including languages like JavaScript, flash, html and CSS.

In this specification, the term "GUI" means a graphical user interface that allows a user to interact with the website. The term "plurality" means at least two.

In this specification, the term "API" means an application programming interface. Typically, an API is an interface implemented by a software program that enables it to interact with other software. An API facilitates interaction between different software programs similar to the way a GUI facilitates interaction between a human user and a website. Typically, an API is implemented through applications, libraries, and operating systems to determine their vocabularies and calling conventions, and is used to access their services. An API could include specifications for routines, data structures, object classes, and protocols used to communicate between the consumer and the implementer of the API.

The term "data API" means an API for the interaction with a set of functions used by components of a software system relating to searching and selection of a data subset from a database.

Figure 2:
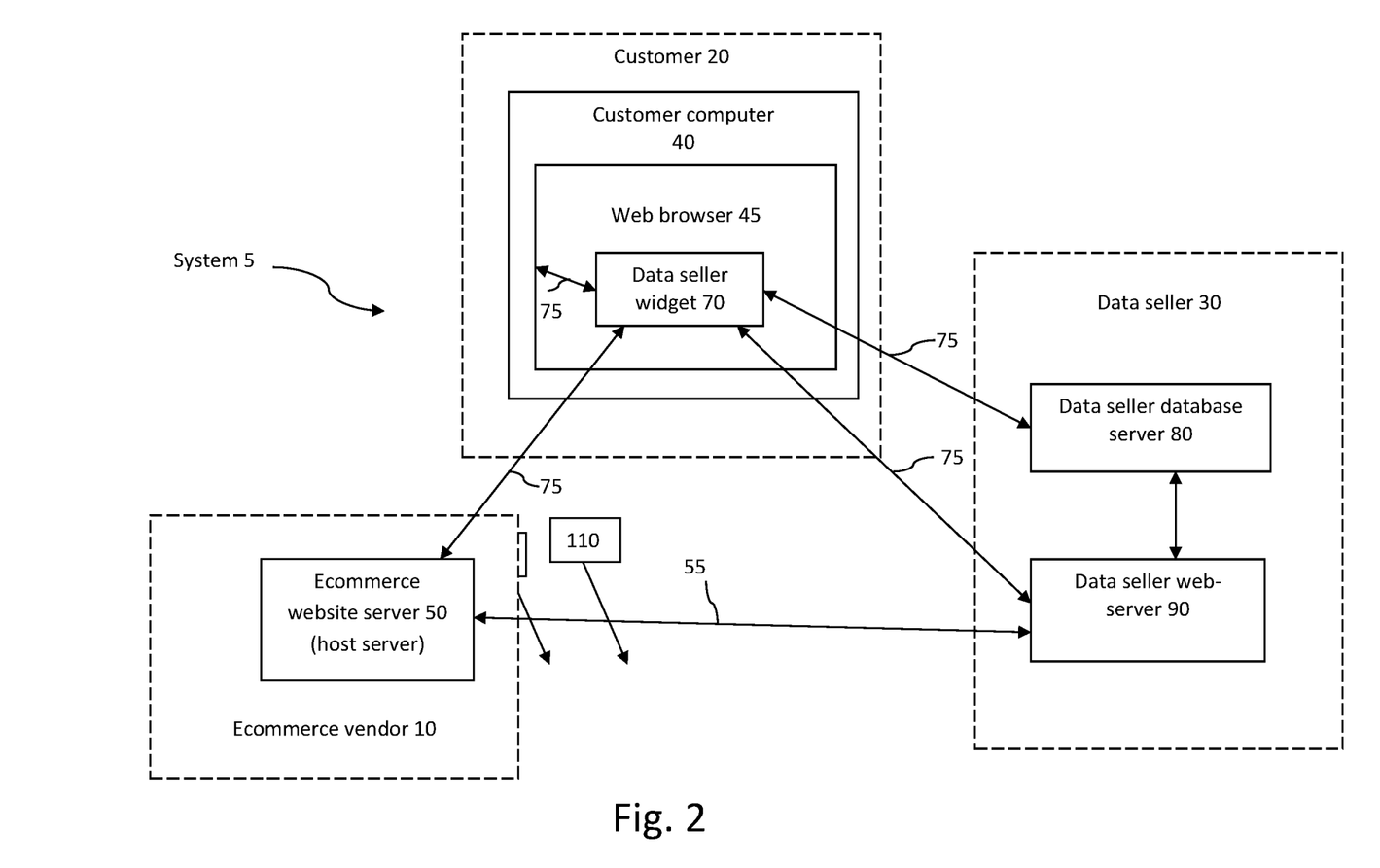
FIG. 2 illustrates the preferred embodiment of the system 5 and the various relationships between the three parties: the ecommerce vendor 10, the customer 20, and the data seller 30.

Turning to FIG. 2, the preferred embodiment of system 5 includes the following elements: (1) a data seller widget 70 located within a web page on a third-party website, (2) a plurality of data APIs 75 for exchanging information between the data seller widget 70 and a plurality of remote computers (typically, the ecommerce website server 50 ('the host server'), the data seller web server 90 and the data seller database server 80), and (3) an API 55 between the data seller web server 90 and the host server for the third-party website 50. The preferred system 5 enables customers of the third-party website to create and purchase subsets of data within the third-party website.

The data seller widget 70 preferably employs an interactive GUI when viewed by a web browser. It is preferred that the GUI appear to the customer 20 as if all of the activity was taking place on the ecommerce site (i.e., that the data seller widget 70 is "transparent" to the customer 20 on the ecommerce site). An example of an interactive GUI is illustrated in FIGS. 3-5.

Among other things, the host server for the third-party website (or ecommerce server) 50 sends list fulfillment requests to the data seller web server 90, downloads mailing list files from the data seller web server 90, and receives conclusion notifications from the data seller widget 70 or data seller web server 90. Typically, the data seller web server 90 hosts the widget script and connects to the data seller data server and hence the list fulfillment databases and database search engine.

Figure 3:
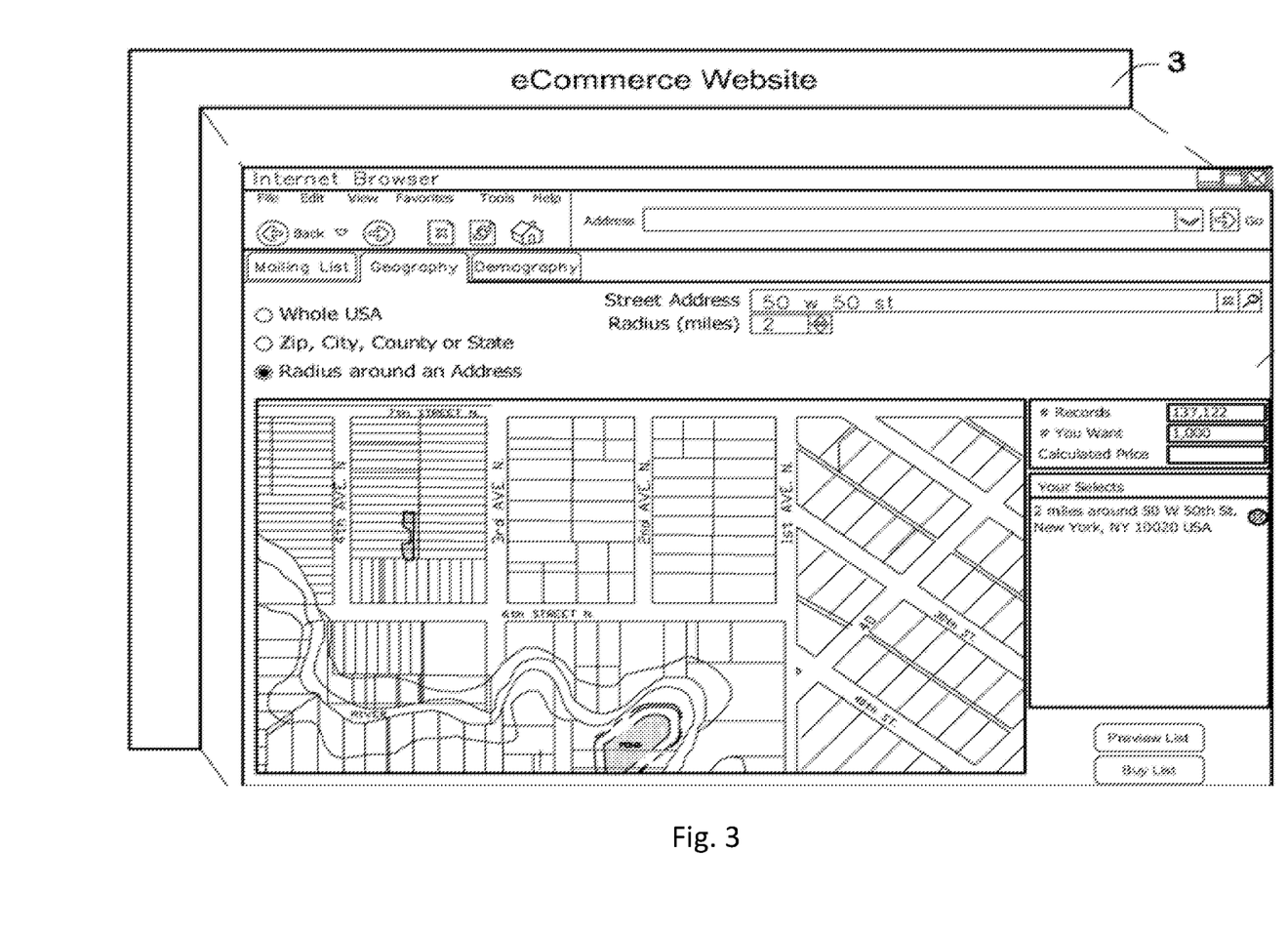
FIG. 3 illustrates the preferred embodiment of the GUI of the data seller widget 70 in geographical mode within an ecommerce website.
Figure 4:
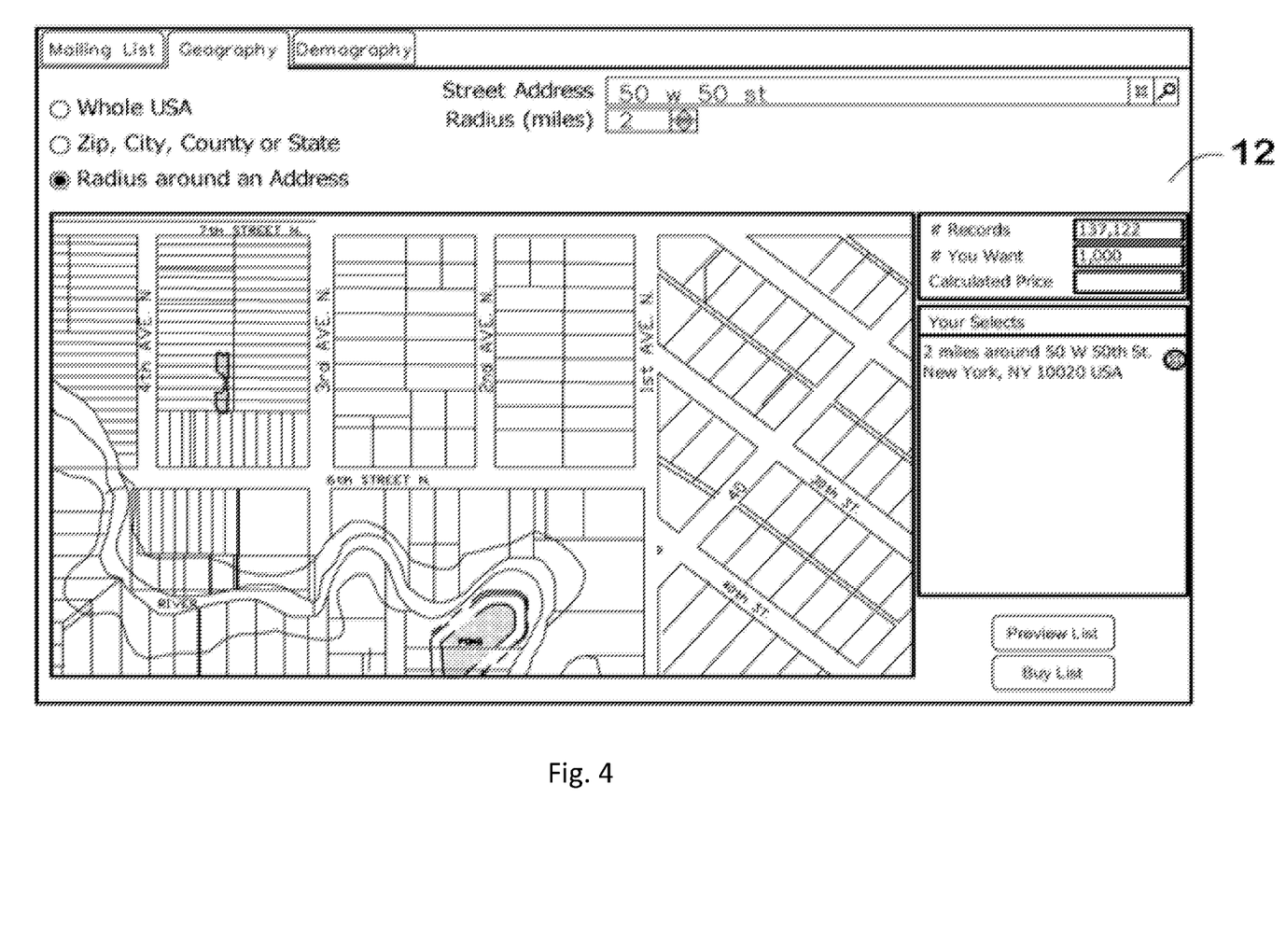
FIG. 4 illustrates the preferred embodiment of the GUI of the data seller widget 70 in geographical mode.

FIG. 3 illustrates one embodiment of the data seller widget 70 GUI located within an ecommerce web site. The GUI of the data seller widget 70 enables the user to select from plurality of databases. FIGS. 3-5 illustrate embodiments of two different types of database criteria: geographic and demographic. Within a database such as the one shown in FIGS. 3-4, a customer 20 could preferably select data subsets like ZIP code, a city, a county, a state, or the whole USA. In addition, a customer 20 can preferably select a data subset of a radius around a certain point.

Figure 5:
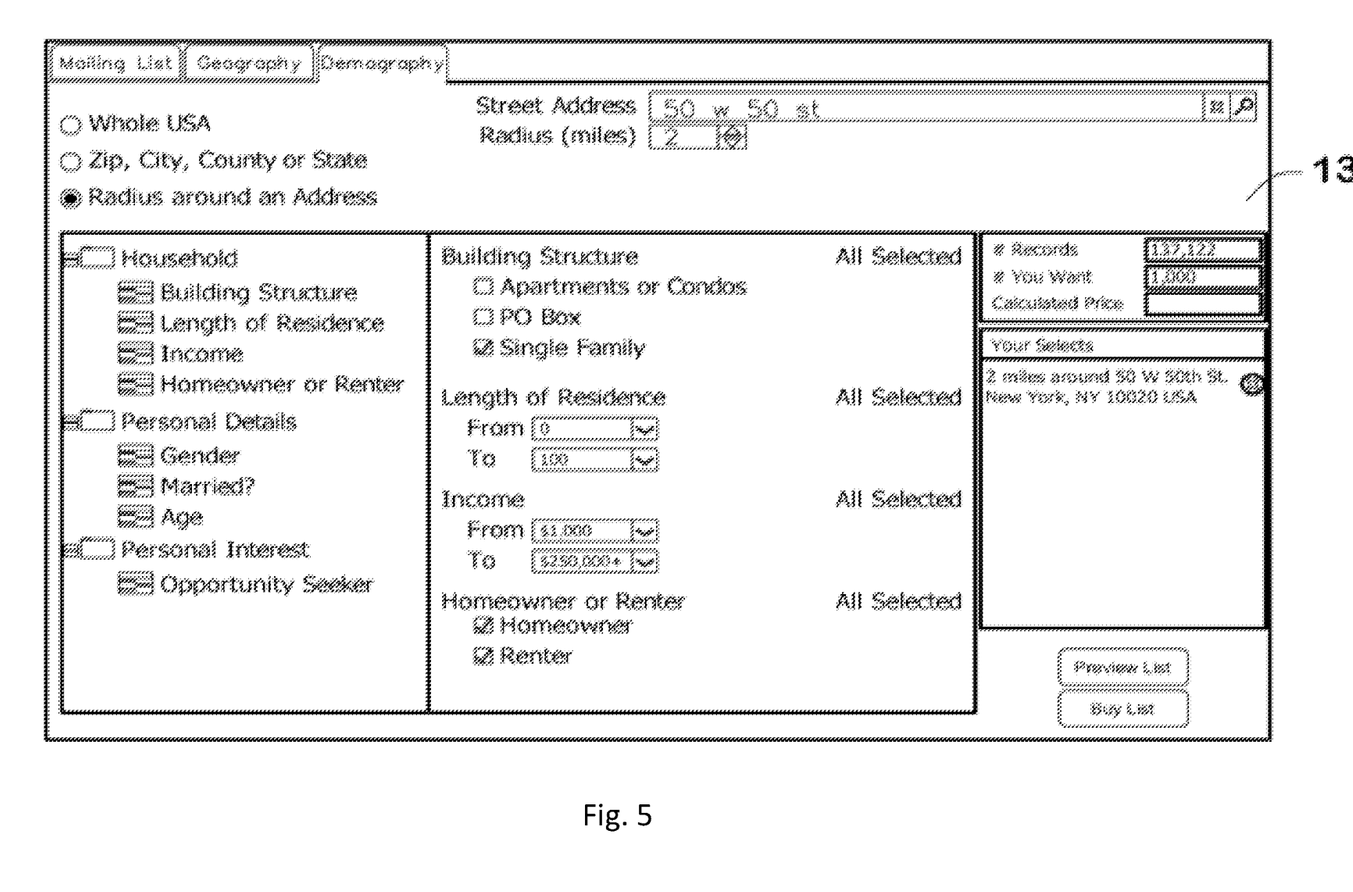
FIG. 5 illustrates the preferred embodiment of the GUI of the data seller widget 70 in demographic mode.

FIG. 5 illustrates a GUI embodiment for a database having demographic fields. Within the database, a customer 20 can preferably select subsets including household, personal demographics, personal interest, building structure, length of residence, income and ownership etc. A plurality of different databases can be present on the data seller database server and made available via the data seller widget. The criteria available for the data widget user to select subsets from are only limited by the various criteria that are present in each database.

The system 5 preferably enables the ecommerce customer 20 to preview the selected subset of data and preview the cost to purchase that list before placing an order. For example, as shown in FIGS. 3-5, the preferred GUI includes a 'list preview' of rows of data matching the list criteria selections made by the user. The list preview would provide the customer enough information to assess the suitability and cost of a proposed subset of data. This provides a customer 20 the ability to anticipate the suitability and cost of a given data subset prior to purchase. These rows can be made available in a 'popup' grid element, with data provided to the data seller widget 70 from the data widget server 90.

As shown in FIG. 2, the preferred data seller widget 70 creates multiple two-way pipelines of information exchange: (1) between the data seller widget 70 and the ecommerce website host server 50 in real-time via API connectivity, (2) between the data seller widget 70 and the data seller database server 80 via API connectivity, and (3) between the data seller widget and the data seller web-server 90 and (4) between the host server for the third-party website 50 and the data seller web server 90. Optionally, another API can exchange information between the widget 70 and the webpage 60.

Within the system 5 it is preferred to use custom JSP (or other appropriate methodology) to generate JavaScript (or other appropriate methodology) objects having instance-level functions or actions that are encapsulated in the data seller widget 70 as well as complete client-side representation of the data seller widget 70 and information returned from the remote database servers via an API. These objects and actions are fully addressable by the ecommerce site developer via a getWidgetByID method on a global utility object or other suitable method known in the art.

Example of Preferred Widget Lifecycle

The typical lifecycle of the preferred data seller widget 70 begins with initialization of the widget by the web page via JavaScript (or other suitable language). Typically, initialization would include the identification of an affiliate code and an access key. The affiliate code and access key would be a unique code assigned to a single third-party website (or vendor 10). This code could be used to identify pricing, security and other desired variables. Other desired codes (e.g. session id) could also be implemented at this time. Multiple different versions of the widget can be configured for example varying the available databases, the selection criteria for each database and the price-points and minimum order quantities. Such multiple versions of the available widgets for any third-party website can also be initiated by additional variables in the access key.

In many cases, only one configuration of list prices and demographics for a given affiliate code is needed. However, sometimes it is necessary to have multiple price (and or demographic) configurations per affiliate code. An example of this requirement is a web-to-print software company that wants to configure the widget 70 for multiple clients. Each client could have different databases to select from if desired. Each client could have a different price and demographics configuration if desired. Preferably, each price and demographics configuration would be pre-configured with the data seller 30. One way to do so would be to allocate each configuration a "dataset key", which is passed to the widget constructor of the data seller web server 90, which could then be used to differentiate between multiple clients for a single affiliate code. If the dataset key is omitted and there are multiple price/demographics configurations setup for the given affiliate code then the first configuration could be used as the default.

Once the widget 70 is initialized, the customer 20 interacts with the tabs, lists, text boxes, buttons (collectively 100) that make up the widget 70 GUI (see FIGS. 3-5). The data API 75 between the widget 70 and the data seller servers 80, 90 allow the customer to search, create and review the desired subsets of data and estimated cost of purchasing the data subset.

Once a customer 20 is satisfied with the customized data subset (e.g., demography, geography, list size, cost, the customer 20 can check out. Normally, this would occur by pressing a 'buy list' button within the GUI. In the preferred system 5, the data seller widget 70 would communicate that the data subset was final and would save the list criteria to the data seller database 20 server. In other words, after the user has committed the list criteria 110 through the data seller widget 70 and any subsequent workflow-related signoffs, the ecommerce site is ready to obtain the final data subset from the data seller. The host server for the third-party website (ecommerce server) 50 would communicate directly with the data seller web server 90 via the API 55 to finalize the list creation and sale, using the previously saved user selected list criteria.

For example, as shown in FIG. 3-5, a customer 20 who has finalized a data subset for purchase would click on the 'buy list' button (referred to here as "widget conclusion"). When this occurs, the widget 70 preferably saves the list criteria to the data seller web server 80. The host server for the third-party website (ecommerce website server) 50 is also notified (typically, via a HTTP POST to the specified URL) by the data seller web server 80. The host server will preferably place the details of the potential data subset in the user's shopping cart ready for checkout, preferably showing the database type from which the data subset was selected, the quantity of records, the subset criteria selected and the online price.

Additionally, the webpage can be notified of the conclusion event via a number of possible methods of which JavaScript is an example callback from the widget to functions defined at widget initialization. Examples of the callback data ordinarily would include a unique list criteria ID, a list type selected by the user, retail price shown to the user, total # records available, quantity of records the user wants, and the host server session ID.

When the host server for the third-party website (ecommerce website server) 50 is ready to actually place an order for a list and receive the list file, the server 50 can make a HTTP POST request to the widget server-side API. Once the server 50 has received a "ready" response, the server can download the actual list file from the data seller web server 90. List download can be tested using a web browser if desired. This typically occurs once the user has placed their order through the ecommerce website and paid for it.

This preferred lifecycle results in a real mailing list file being created and made available for download. The selling price between the data seller and the ecommerce website associated with this list file is preferably provided at the widget conclusion stage and can be charged to a pre-registered credit card at time of list fulfillment.

As a result of the interaction between (1) the data seller widget 70 and the ecommerce site 50, 60, (2) the data seller widget 70 and the database servers 80, 90 and (3) the database servers 80, 90 and the ecommerce site 50, 60, the customer can experience higher-level, real-time interactivity.

Alternate Embodiments

Many additional features, combinations, and permutations can be utilized with the system 5. For example, a data seller widget 70 interface might provide a Search box akin to the Google search box on www.google.com that enables the customer 20 to search for the exact type of mailing list a customer 20 might desire. This is important as the complete universe of mailing lists types is very large and therefore difficult to represent concisely in the data seller widget 70 interface via lists, trees and other user interface elements. The data seller widget 70 server would intelligently and flexibly look for matches in the demographics available and present these back to the customer 20 in the data seller widget 70, enabling the customer 20 to jump directly to the desired demographic option within the data seller widget 70 Demography tab.

In another embodiment, the sample data can be accessed by the host ecommerce site 50 in addition to being available by selecting "list preview" on the widget 70. For example, a customer may want to send a customized direct-mail campaign to a data sub-set. When things like artwork (could be direct-mail also email also SMS message) comprise fields of the database, software rules can drive the content of each piece printed (for example men should receive a certain image while women receive a different image—people with an income over say $100 k p.a. receive different textual message than those with an income <$100 k p.a.). By making the "list preview" data available within the host ecommerce application (after the customer has added their list to the shopping cart but before they checked out and paid for it)—they can "map" the fields in the "list preview" to the designated fields (variable data) in their artwork (because the list preview data contains the demographics as well as address information). In this way the customer can preview multiple one-to-one messages addressed to members of the data-subset each with demographically appropriate graphics and text, all prior to ordering the data subset or the outbound media (direct-mail/email/SMS). Data can be (a) direct-mail (b) emails (c) SMS messaging—or any other attribute as needed.

Different data seller widgets 70 can be created and configured to address the specific needs of the ecommerce site. That is, different widgets 70 for different sets of ecommerce applications—perhaps showing different databases and different demographic selection filters. Likewise, a widget 70 can be configured as a self-contained "list vending machine" by combining a checkout and payment option together with list download.

The data seller widget could communicate directly with a Graphical Information System (GIS) map service provider coded in JavaScript such as Google Maps Application Programming Interface (API), Yahoo Maps, Microsoft Maps, etc to effect: a) Geocoding of addresses, states, counties, cities, zips, b) Maps for display to customer.

The data widget server 90 to data widget 70 communications could be via asynchronous JavaScript messaging ('AJAX'), e.g. using the XMLHttpRequest (XHR) object. Data could be encoded in JSON format.

The Graphical User Interface (GUI) elements of the data seller widget 70, which enable the customer to interact with the data seller widget 70, could be implemented via a 3rd party JavaScript framework such as: ExtJS, JQuery, Prototype, Scriptaculous, Mootools, YUI etc. Standardized (e.g. United States Postal Service (USPS)) geographic place names could be delivered from the data widget server to the data seller widget 70 as necessary.

The data seller widget 70 could provide the customer with USPS or other source as appropriate standardized place-names from which to select their required geographic subset of data.

In another embodiment or combined with the above, the customer could enter any physical address to use a center point for a radius around an address. By integration with a suitable place-names service a latitude and longitude is returned by that service or services enabling a map to be drawn and shown to the customer via the GUI of the data seller widget 70.

In another embodiment, the GUI of the data seller widget 70 incorporates a real-time mapping service provided by a third-party provider as SAAS. This enables the data seller widget 70 GUI to present meaningful maps to the customer 20 in real-time, reflecting their selected geographic subset for the database.

In another embodiment, with each change of the geographic and or demographic selected subset of the database via the data seller widget 70 GUI the API connection to the database on the remote data seller database server enables an exchange of data via the API such that the database server is queried and returns via the API to the data seller widget 70 the resulting count numbers reflecting the subset of data requested by the customer 20 and selected using the data seller widget 70 GUI. In this way the customer can quickly assess the size and details of the subset of data as they make changes to either or both the geographic and demographic criteria via the data seller widget 70 GUI.

In another embodiment, the database server 80 can show the user a 'list preview' by returning a string of data in XML or JSON or other appropriate and suitable format which is a sample of the subset of the database. These samples of the subset selected by the customer can be displayed to the customer via the GUI of the data seller widget 70 enabling them to approve the subset prior to placing an order for the actual subset of data.

In another embodiment, the data seller widget 70 via the database server 80 can enable the customer to place an order for the count/database subset within the ecommerce site.

In another embodiment, the database server 90 communicates via an API to the ecommerce site 50 and transmits details of the count/database subset to the ecommerce site 50. This information may be added to the customers shopping cart in the ecommerce site 50.

In another embodiment, the database server 90 communicates via an API with the ecommerce site 50 and transfers various information but not limited to the count/database-subset count, database type, pricing, count by geographic and demographic criteria within the count/database subset, details of the sample subset of data together with details of the particular customer.

In another embodiment, when a customer 20 checks-out of the ecommerce site having purchased the database subset then the host server for the third-party website communicates with the database server 90 via an API and indicates that specific subset of the database has been purchased. The database server returns to the ecommerce site 50 via an API specific information regarding an unique Uniform Resource Locator (URL) which points to the unique location of the database subset in a Comma Separated Values (CSV) or other appropriate format. The ecommerce site 50 may then transfer the CSV file into that site's appropriate file filing system.

In another embodiment, the owner of the data seller widget 70 may charge the ecommerce site at the agreed price structure, utilizing a credit card on file, the price agreed between the data seller widget 70 owner and the ecommerce site for the trade price of the subset of data delivered.

And with respect to visual appearance to the customer, the administrator of the ecommerce host site can change the skin the widget 70 to make it appear as part of the ecommerce site. For example, an administrator could (a) change the textual labels on the buttons "add to cart" vs. "buy list", (b) hide the prices on the widget 70, many other modification limited only by the administrator's discretion.

In another embodiment, the widget 70 is made available through either a desktop application or an application provided as SAAS. Examples of such applications can be Contact Relationship Management Systems (CRM) and postal software applications. In such cases the data widget can be accessed by a user through an application. A link on the application initiates a web browser into which the data widget 70 is located. The resulting user-defined subset of data can then be automatically added via the API into the application's data store for use by the user. In this way the data widget can be used to generate data subsets for use by another application.

In another embodiment, the shopping cart and checkout process is provided by a "fourth" party (a different website from the host site for the data widget). The data widget being on the third-party website and the shopping cart and checkout on another website. In this way the data widget 70 can be located on any reseller's website with the checkout occurring on a different website. This embodiment enables a data seller to distribute data widgets through their reseller network with multiple data widgets connecting to one or more shopping carts and checkout mechanisms on one or more remote websites.

Although the invention has been described in detail with reference to one or more particular preferred embodiments, persons possessing ordinary skill in the art to which this invention pertains will appreciate that various modifications and enhancements may be made without departing from the spirit and scope of the claims that follow.

What is claimed is:

1. An ecommerce server for use in connection with a system configured to enable a search and purchase of data subsets from a data seller, the ecommerce server comprising:
   a first processor and a first memory;
   the ecommerce server configured to operate an ecommerce website configured to sell print services to a customer, the ecommerce website comprising a widget,
   the widget configured for a two-way exchange of data between the widget and the ecommerce server over a first direct connection between the widget and the ecommerce server,
   the widget further configured for a two-way exchange of data between the widget and a data-seller database server and a data-seller database over a second direct connection, the data-seller database server comprising a second processor and a second memory,
   the data-seller database server connected to the data-seller database; the widget and second direct connection further configured to enable the customer to extract a subset of data from the data-seller database, and
   the ecommerce server configured to receive a price from the data-seller database server, wherein the widget is configured to:
      receive, from a customer device, data indicative of a request for a subset of data from the data-seller database;
      communicate directly with the data-seller database to extract the subset of data; and,
      provide the extracted subset of data to the ecommerce website for use with the print services.

2. The ecommerce server of claim 1 further configured to connect to a data seller web-server, the data seller web-server controlled by the data seller and connected to the database server.

3. The ecommerce server of claim 2, wherein the data seller web-server is connected to the ecommerce server.

4. The ecommerce server of claim 3, wherein the data seller web-server hosts a script for the widget.

5. The ecommerce server of claim 1, wherein the ecommerce website is integrated into a software application installed on a computer operated by the customer.

6. The ecommerce server of claim 1, the database comprising geographic data.

7. The ecommerce server of claim 6, the geographic data comprising zip codes, cities, counties, states, and adjustable radii about a map point.

8. The ecommerce server of claim 1, the database comprising demographic data.

9. The ecommerce server of claim 8, the demographic data comprising household data, personal demographic data, personal interest data, building data, and income data.

10. The ecommerce server of claim 1, the widget further comprising an affiliate code.

* * * * *